United States Patent
Kulkarni

(10) Patent No.: US 12,384,401 B2
(45) Date of Patent: *Aug. 12, 2025

(54) VEHICULAR DRIVING ASSIST SYSTEM WITH DRIVER MONITORING

(71) Applicant: Magna Electronics Inc., Auburn Hills, MI (US)

(72) Inventor: Gaurav S. Kulkarni, Pune (IN)

(73) Assignee: Magna Electronics Inc., Auburn Hills, MI (US)

( * ) Notice: Subject to any disclaimer, the term of this patent is extended or adjusted under 35 U.S.C. 154(b) by 157 days.

This patent is subject to a terminal disclaimer.

(21) Appl. No.: 18/459,498

(22) Filed: Sep. 1, 2023

(65) Prior Publication Data

US 2023/0406342 A1    Dec. 21, 2023

Related U.S. Application Data

(63) Continuation of application No. 18/061,496, filed on Dec. 5, 2022, now Pat. No. 11,745,755, which is a
(Continued)

(51) Int. Cl.
*B60Q 1/00* (2006.01)
*B60W 40/04* (2006.01)
(Continued)

(52) U.S. Cl.
CPC ............ *B60W 50/14* (2013.01); *B60W 40/04* (2013.01); *B60W 40/08* (2013.01); *G06V 20/597* (2022.01);
(Continued)

(58) Field of Classification Search
CPC ...... B60W 50/14; B60W 40/04; B60W 40/08; B60W 2040/0818; B60W 2050/143;
(Continued)

(56) References Cited

U.S. PATENT DOCUMENTS 5,550,677 A    8/1996   Schofield et al.
5,670,935 A    9/1997   Schofield et al.
(Continued)

FOREIGN PATENT DOCUMENTS

WO    2022187805 A1    9/2022

*Primary Examiner* — Anh V La
(74) *Attorney, Agent, or Firm* — HONIGMAN LLP

(57) ABSTRACT

A vehicular driving assist system includes (i) a forward-viewing camera disposed at a windshield of a vehicle viewing forward of the vehicle through the windshield and (ii) an in-cabin camera disposed at an interior rearview mirror assembly in an interior cabin of the vehicle and viewing at least a steering wheel of the vehicle. The forward-viewing camera and the in-cabin camera are operable to capture image data. Image data captured by the forward-viewing camera is transferred from the forward-viewing camera to an electronic control unit (ECU) and is processed at the ECU for at least one advanced driver assistance system or to determine a hazardous condition ahead of the vehicle. Processing by the vehicular driving assist system of image data captured by the in-cabin camera determines that at least one hand of a driver of the vehicle is not on the steering wheel of the vehicle.

69 Claims, 5 Drawing Sheets

Related U.S. Application Data continuation of application No. 17/450,721, filed on Oct. 13, 2021, now Pat. No. 11,518,401.

(60) Provisional application No. 63/198,372, filed on Oct. 14, 2020.

(51) Int. Cl.
*B60W 40/08* (2012.01)
*B60W 50/14* (2020.01)
*G06V 20/59* (2022.01)
*G06V 40/10* (2022.01)

(52) U.S. Cl.
CPC ... *G06V 40/107* (2022.01); *B60W 2040/0818* (2013.01); *B60W 2050/143* (2013.01); *B60W 2050/146* (2013.01); *B60W 2540/223* (2020.02); *B60W 2554/802* (2020.02); *B60W 2556/10* (2020.02); *B60W 2556/50* (2020.02)

(58) Field of Classification Search
CPC ..... B60W 2050/146; B60W 2540/223; B60W 2554/802; B60W 2556/10; B60W 2556/50; B60W 2040/0872; B60W 2556/40; G06V 20/597; G06V 40/107
USPC .................. 340/435, 436, 439, 903, 905
See application file for complete search history.

(56) References Cited

U.S. PATENT DOCUMENTS

| | | |
|---|---|---|
| 5,949,331 A | 9/1999 | Schofield et al. |
| 7,038,577 B2 | 5/2006 | Pawlicki et al. |
| 7,720,580 B2 | 5/2010 | Higgins-Luthman |
| 7,855,755 B2 | 12/2010 | Weller et al. |
| 7,914,187 B2 | 3/2011 | Higgins-Luthman et al. |
| 9,405,120 B2 | 8/2016 | Graf et al. |
| 10,017,114 B2 | 7/2018 | Bongwald |
| 10,065,574 B2 | 9/2018 | Tiryaki |
| 10,071,687 B2 | 9/2018 | Ihlenburg et al. |
| 10,099,614 B2 | 10/2018 | Diessner |
| 10,388,157 B1 | 8/2019 | Hayes et al. |
| 10,703,268 B2 | 7/2020 | Levkova et al. |
| 10,935,974 B1 | 3/2021 | Fields et al. |
| 11,518,401 B2 | 12/2022 | Kulkarni |
| 11,745,755 B2 | 9/2023 | Kulkarni |
| 2014/0336876 A1 | 11/2014 | Gieseke et al. |
| 2015/0009010 A1 | 1/2015 | Biemer |
| 2015/0015710 A1 | 1/2015 | Tiryaki |
| 2015/0022664 A1 | 1/2015 | Pflug et al. |
| 2015/0092042 A1 | 4/2015 | Fursich |
| 2015/0232030 A1 | 8/2015 | Bongwald |
| 2015/0294169 A1 | 10/2015 | Zhou et al. |
| 2015/0296135 A1 | 10/2015 | Wacquant et al. |
| 2015/0352953 A1 | 12/2015 | Koravadi |
| 2016/0137126 A1 | 5/2016 | Fursich et al. |
| 2016/0209647 A1 | 7/2016 | Fursich |
| 2017/0101111 A1 | 4/2017 | Fung et al. |
| 2017/0217367 A1 | 8/2017 | Pflug et al. |
| 2017/0274906 A1 | 9/2017 | Hassan et al. |
| 2018/0170372 A1 | 6/2018 | Takamatsu et al. |
| 2018/0222414 A1 | 8/2018 | Ihlenburg et al. |
| 2018/0231976 A1 | 8/2018 | Singh |
| 2020/0057487 A1 | 2/2020 | Sicconi et al. |
| 2020/0086889 A1* | 3/2020 | Kaneko ................ G08G 1/166 |
| 2020/0143560 A1 | 5/2020 | Lu et al. |
| 2020/0202151 A1 | 6/2020 | Wacquant |
| 2020/0208998 A1* | 7/2020 | Xiang ................ G06F 16/29 |
| 2020/0320320 A1 | 10/2020 | Lynam |
| 2021/0291739 A1 | 9/2021 | Kasarla et al. |
| 2021/0293572 A1 | 9/2021 | Konrardy et al. |
| 2021/0323473 A1 | 10/2021 | Peterson et al. |
| 2021/0402942 A1* | 12/2021 | Torabi ................ G06N 3/02 |
| 2022/0242438 A1 | 8/2022 | Sobecki et al. |
| 2022/0254132 A1 | 8/2022 | Rother |

* cited by examiner

VEHICULAR DRIVING ASSIST SYSTEM WITH DRIVER MONITORING

CROSS REFERENCE TO RELATED APPLICATIONS

The present application is a continuation of U.S. patent application Ser. No. 18/061,496, filed Dec. 5, 2022, now U.S. Pat. No. 11,745,755, which is a continuation of U.S. patent application Ser. No. 17/450,721, filed Oct. 13, 2021, now U.S. Pat. No. 11,518,401, which claims the filing benefits of U.S. provisional application Ser. No. 63/198,372, filed Oct. 14, 2020, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of cameras or imaging sensors in vehicle imaging systems is common and known. Examples of such known systems are described in U.S. Pat. Nos. 5,949,331; 5,670,935 and/or 5,550,677, which are hereby incorporated herein by reference in their entireties. It is also known to implement a camera within the cabin of the vehicle for use in monitoring the driver of the vehicle, such as to determine driver attentiveness or gestures made by the driver.

SUMMARY OF THE INVENTION

A driving assistance system or vision system or imaging system for a vehicle utilizes one or more interior cabin viewing cameras (preferably one or more CMOS cameras) to capture image data representative of images interior of the vehicle, and provides a GPS sensor and an electronic control unit (ECU) comprising electronic circuitry and associated software. The electronic circuitry of the ECU includes an image processor for processing image data captured by the in-cabin camera or cameras to detect presence of objects in the view of the in-cabin camera or cameras. The vehicular vision system, responsive to processing by the image processor of image data captured by the in-cabin camera or cameras, determines a position of the vehicle driver's hands. The vehicular vision system, responsive to determining that at least one of the driver's hands is not on the steering wheel and responsive to determining that the vehicle is at or near or approaching a hazardous condition or location, generates an alert for the driver. The vehicular vision system may determine that a current position of the vehicle is near the hazardous location responsive at least in part to an output of a global positioning system of the vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
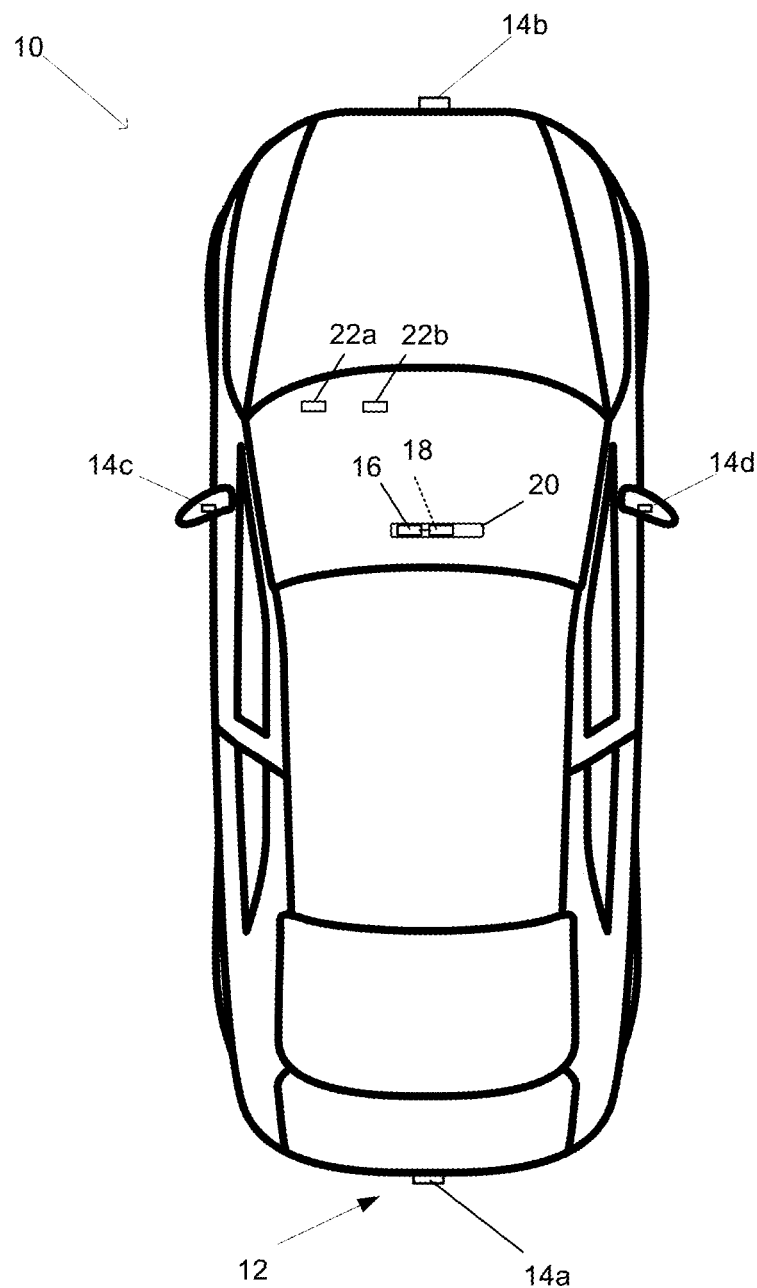
FIG. 1 is a plan view of a vehicle with a vision system that incorporates cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the system, such as via processing of image data by the image processor at the ECU, may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The vision system 12 includes one or more interior or in-cabin cameras 22a, 22b. For example, the system may include a left interior camera 22a and a right interior camera 22b. The one or more interior cameras are disposed within the vehicle (such as at an interior rearview mirror assembly of the vehicle or at an overhead console of the vehicle or at an instrument panel of the vehicle or at an A-pillar of the vehicle or the like) such that they capture images interior of the vehicle. For example, the one or more interior cameras may capture image data representative of at least a portion of the driver. The one or more interior cameras may capture image data representative of the driver's hands and/or the steering wheel of the vehicle. Image data captured by the interior camera or cameras is processed to determine whether or not the driver's hands are at or on, for example, the steering wheel, whereby an alert may be generated based on determination that the driver's hands are not on the steering wheel and based on a current driving condition or geographical location of the vehicle, as discussed below.

With an increasing number of vehicles equipped with Advanced Driver Assistance Systems (ADAS) that are capable of partially controlling the longitudinal and lateral movement of a vehicle, some drivers tend to show overreliance on these assistance systems. Numerous instances of drivers misusing the systems (e.g., acting as if the vehicle is fully "self-driving" and taking their hands off the steering wheel or even leaving the driver seat) have been recorded. Unfortunately, this irresponsible behavior has already led to fatal crashes. Thus, hands on the steering wheel is considered to be an indicator of the driver being in control of the vehicle or at least being in a position to quickly take over control of the vehicle if needed.

The problem with road security is a legitimate study area for humanitarian reasons, public health reasons, and economic health reasons. Road accidents are one of the main contingencies of industrial societies and represent an economic and public health aspect that is gaining major importance in other developing countries. Traveling is an inherently risky activity, as the movement creates kinetic energy and if an accident or crash happens, the energetic exchange can be harmful to humans and objects involved. Traveling, especially by road, is one of the most dangerous activities people do.

Figure 2:
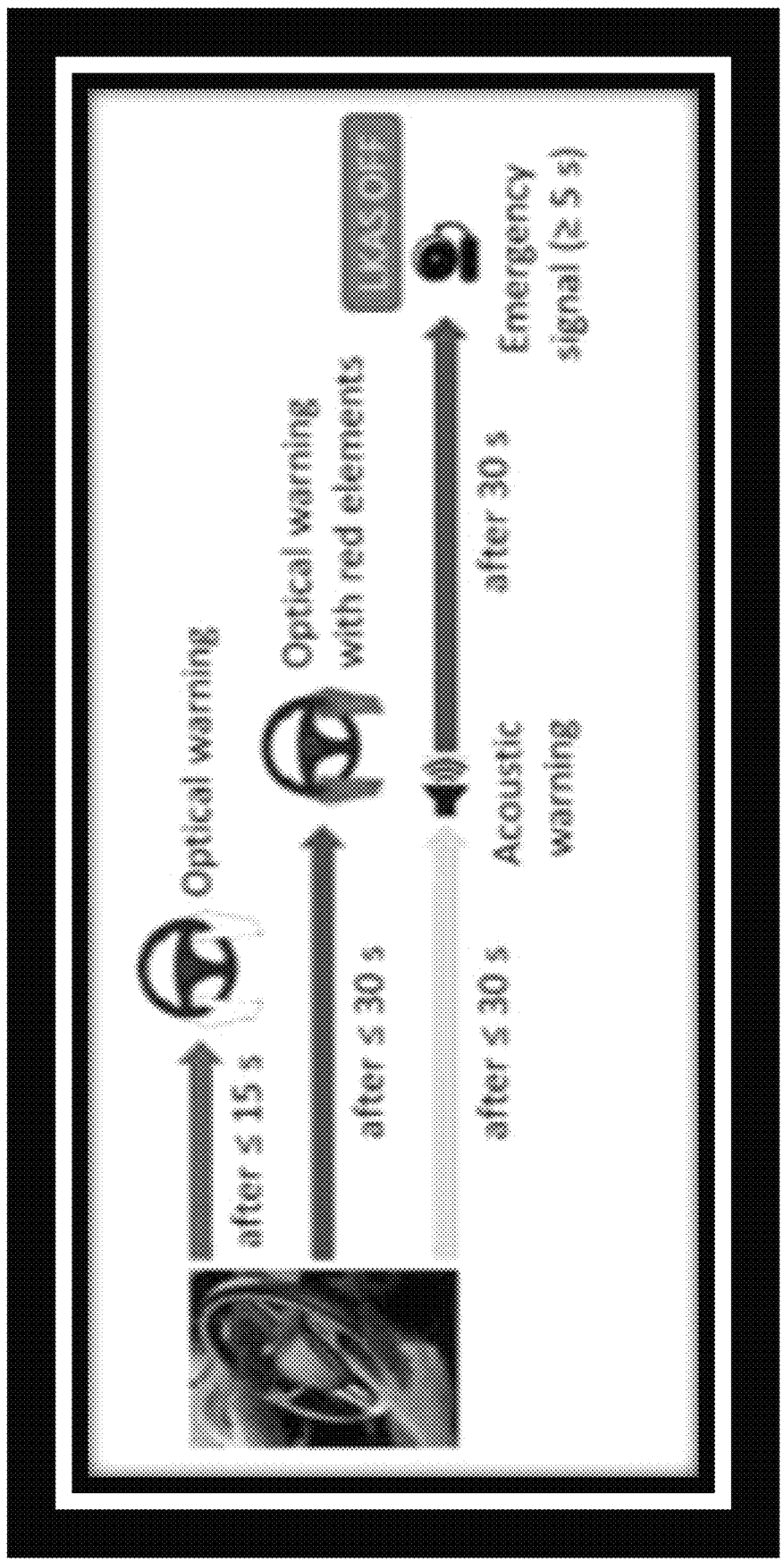
FIG. 2 is a schematic view of different levels of alerts for a driver.

Regulatory authorities have taken significant steps to prevent drivers from misusing steering assistance systems that are designed for hands-on use (i.e., are not designed for hands-free use). To address driver misuse related safety concerns, some governments have mandated that vehicles equipped with a Lane Keeping Assist System (LKAS) must be capable of detecting whether the driver is in control of the steering of the vehicle. Additionally, these mandates often describe an escalating warning strategy as shown in FIG. 2. For example, the system may determine that driver control is not detected and generate warnings based on the length of time during which driver control has not been detected. After determining that driver control has not been detected for a period of time, such as a period of time less than or equal to 15 seconds, the system may generate an optical or visual warning. After determining that driver control has not been detected for a longer period of time, such as less than or equal to 30 seconds, the system may generate an optical or visual warning with red elements. After determining that driver control has not been detected for the period of time less than or equal to 30 seconds, the system may also or otherwise generate an acoustic warning, and after determining that driver control has not been detected for a period of time of 30 additional seconds (60 seconds total), the system may generate an emergency signal for greater than or equal to 5 seconds and disengage the LKAS. Thus, the exemplary system may begin with an optical warning when the system has not detected driver control for over 15 seconds (or other suitable first threshold time period) and an optical warning with red elements when the system has not detected driver control for 30 or more seconds (or other suitable second threshold time period). The system may also include acoustic warnings after 30 seconds and may disengage the LKAS at 60 seconds (or other suitable third threshold time period).

To meet these regulations and mandates, it is of utmost importance to have a reliable and robust detection system for detecting driver steering control. It is equally important to avoid setting off false alarms when the driver has control of the steering system. Thus, implementations described herein provide a driver assistance system that can precisely classify between hands on/off to ascertain whether the driver is in control of the vehicle. The system provides the driver with a visual audio alert that informs the driver of proximity to an area of high incidence of highway accidents only if their driving behavior indicates a higher than normal incident probability. The system includes a video sensor or imaging device (e.g., one or more cameras) for detecting and supervising driver behavior (e.g., manual distractions). The system may provide driver hand supervision (i.e., monitors the driver's hands with the one or more cameras). The system may include a GPS receiver and determine whether the vehicle's current position (via the GPS receiver) is in proximity to known hazardous locations via, for example, accessing a database of hazardous locations or "black spots" (i.e., places with high concentration of accidents such as a geographical location that has had at least three catastrophic events). The outputs of one or more cameras or other image sensors and the GPS sensor may be combined to evaluate a possible risky behavior. Due to the high risk of areas near these hazardous locations, driver concentration must be ensured and driver distraction should be minimized.

The system provides detection and characterization of the steering wheel in the cabin of a vehicle in order to delineate a region of interest (ROI), and detects the hands of the driver inside the ROI in order to ensure that both hands are on the steering wheel of the car. The system may offer the driver a visual warning or auditory warning that allows for the prevention of potential accidents caused because the driver lacks proper concentration or fails to realize the dangers of a high risk area.

Figure 3:
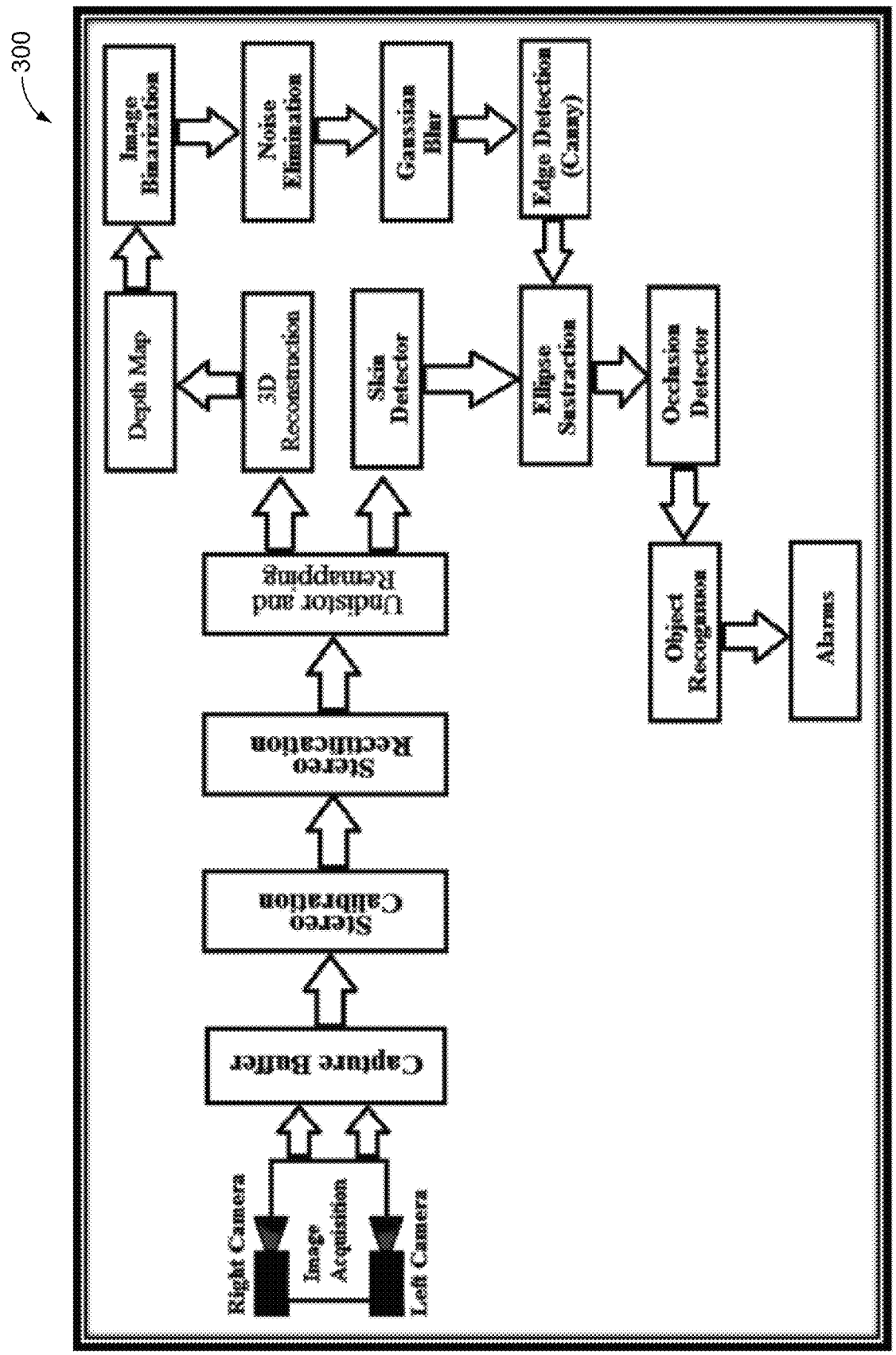
FIG. 3 is a block diagram of the vehicle vision system.
Figure 4:
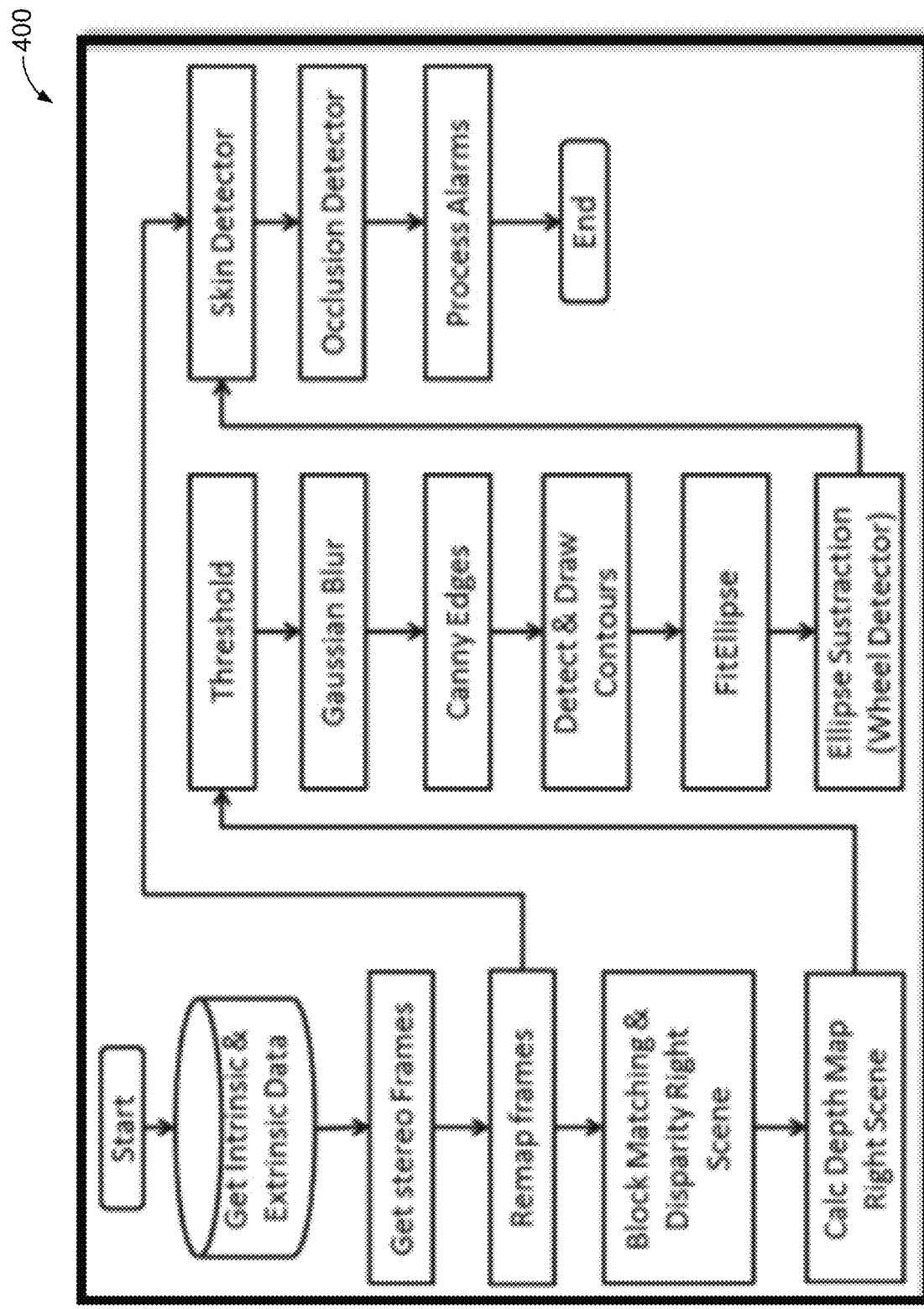
FIG. 4 is another block diagram of the vehicle vision system.

Referring now to FIGS. 3 and 4, block diagrams 300 and 400 illustrate a high-level implementation of the system. Optionally, and such as shown in FIG. 1, the system may include two cameras 22a, 22b (e.g., a right camera 22b and a left camera 22a). The cameras may have a minimum resolution of 640×480. The cameras may capture image data in stereo vision. The system includes camera calibration to determine the intrinsic and extrinsic camera parameters for further processing in real time video frames to produce 3D images or videos or to carry out the calculation of depth maps in order to identify plans within a scene. The camera-based vision system is designed to extract 3D information from digital images and use these for examining the position of objects in two images and to build an advanced object recognition system that recognizes objects in different arrangements (e.g., when objects are placed one in front of the other), tracking different objects, etc.

The two cameras (e.g., the left camera and the right camera) are located at a known distance from each other. The cameras capture image data of the scene simultaneously. Using the geometry of the cameras the system may apply algorithms and determine the geometry of the environment. The cameras achieve the efficient detection of the driver's hands and their position in the area of the steering wheel of the vehicle by first detecting the steering wheel's ellipse via 3D reconstruction techniques.

Figure 5:
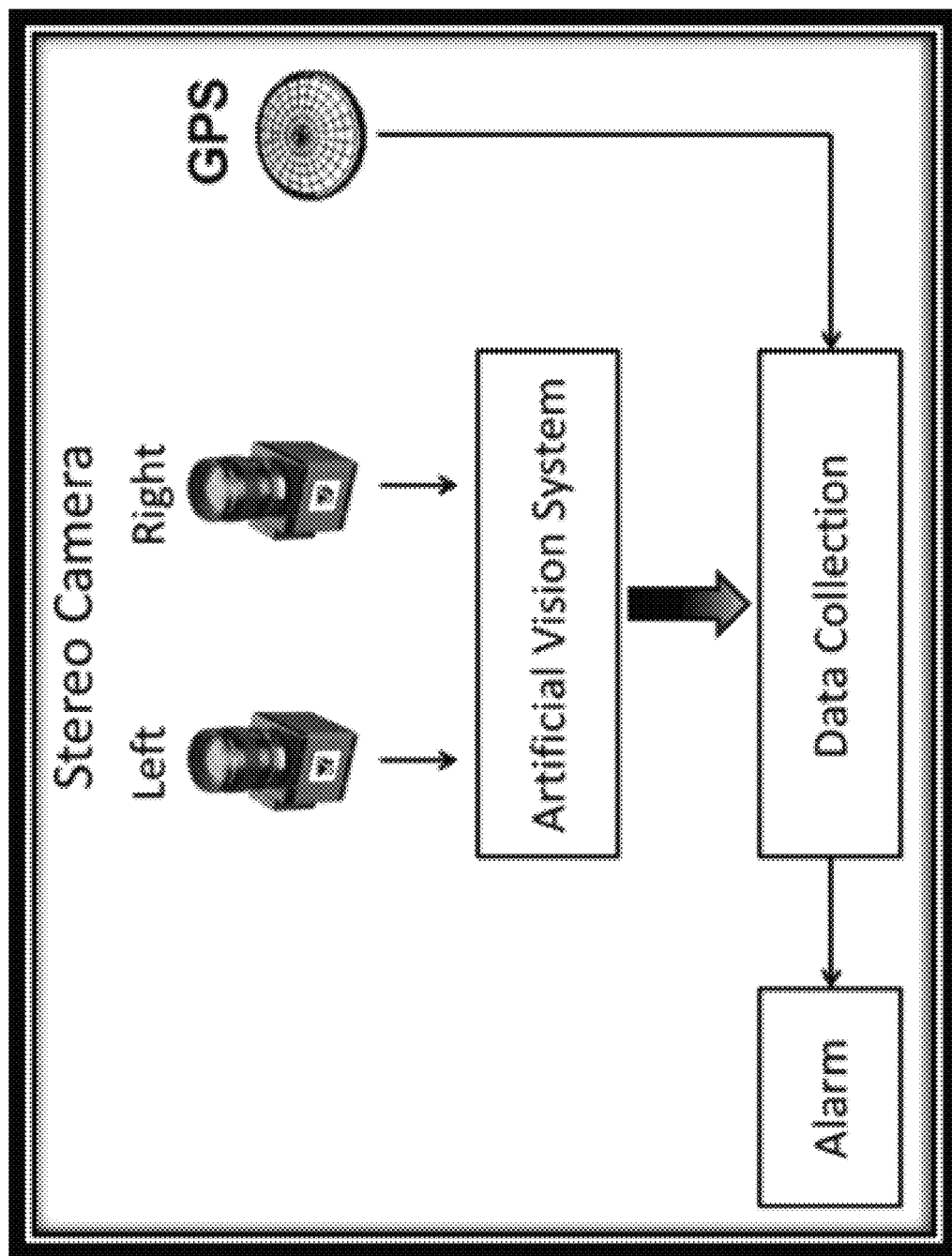
FIG. 5 is a block diagram that includes a GPS sensor.

Referring now to FIG. 5, the system obtains GPS details (e.g., the location of the vehicle) while monitoring the steering wheel and driver's hands so the system can determine when an alarm should be triggered. The GPS receiver is highly sensitive and may be powered by a passive antenna. The receiver module is capable of tracking multiple satellites simultaneously. Integration of the GPS receiver and a microcontroller computer may be accomplished through the use of a wired connection (e.g., RS232C), and/or the GPS and the ECU or controller may be connected and in communication via a network bus of the vehicle (such as a CAN bus or the like). Optionally, the system may allow data frames to be obtained (e.g., via a USB connection) for additional analysis. The GPS sensor may be connected through a USB serial port to the controller (e.g., the ECU) to determine the position of the vehicle in real time (e.g., one sample per second) and obtain important processing parameters such as geo-referenced position, UTC time, and vehicle speed in knots per second in order to maintain compatibility between the metric and English measurement system.

Optionally, the system generates an audible warning to the driver using a speaker. For example, the speaker may be 0.5 watts, eight ohms, and approximately five centimeters in diameter. The speaker may be disposed above the driver's head (e.g., at the cabin liner, at the top of the windshield, at the interior rearview mirror assembly, etc.). The system may reproduce audio sequences and convert the sequences to PWM for their output through the speaker in the form of an audible output of a voice. The objective of the system is to manage the visible and audible alarms. It is intended to allow the alarm to maintain independence with respect to the image processing and easing the maintenance and diagnosis of errors.

Thus, the system allows for data analysis via a USB connection (or other wired or wireless connection). The system may generate an alarm in the event the driver is not keeping his or her hands on the steering wheel or otherwise does not appear to be controlling the vehicle. The alarm may be configurable (e.g., the system may be adjusted to provide an alarm having a different or selected duration, intensity, trigger conditions, etc.). Optionally, after the system determines that one or both of the driver's hands are not on the wheel for a first threshold period of time (e.g., 15 seconds), the system generates a first phase of alert. The first phase of the alert may be an optical warning. For example, the first phase of the alert may include generating an icon or other visual message to instruct the driver to return his or her hands to the steering wheel. After a second threshold period of time (e.g., 30 seconds), the system may generate a second phase of the alert. For example, the second phase may include the optical warning and additional and more intense visual indicators (e.g., red elements). The second phase of the alert may also include an audible alert, such as a tone or spoken words instructing the driver to return his or her hands to the steering wheel. After a third threshold period of time (e.g., 60 seconds), the system may generate a third phase of the alert. The third phase of the alert may include disengaging some or all driver assistance systems such as LKAS and engaging emergency signals of the vehicle. The system may also perform other actions, such as braking the vehicle and/or pulling the vehicle over onto a shoulder of the road. The alert may include any number of phases and each respective threshold period of time may include any amount of length.

The system may generate an alert or alarm when the driver has only one hand on the steering wheel or no hands on the steering wheel. The system may only generate alarms (or may adjust the alarm or the timing of the alarm) when the vehicle is near hazardous locations or black-spots or otherwise dangerous or hazard areas or sections of road. The system may generate a first configurable alarm when the vehicle is near a black-spot and may generate a second configurable alarm when the vehicle is not near a black-spot. For example, the system may generate an alarm when the driver has only one hand on the steering wheel near a determined hazardous location or black-spot, but the system may not generate an alarm when the driver has only one hand on the steering wheel, but the vehicle is not near a black-spot.

Optionally, the system may only generate an alarm when it does or does not detect the driver's hands at certain locations. For example, the system may not generate an alarm when one of the driver's hand is not on the steering wheel when the system determines that the driver's hand in another important location for driving (e.g., a gear shift, turn signal, etc.). The system may, via processing of image data captured by the cameras, track the position of the driver's hands throughout the cabin of the vehicle.

Therefore, the system determines when a driver is or is not in a position for controlling the vehicle (e.g., having one or both hands on the steering wheel). The system also determines when the current geographical location of the vehicle (as determined via a global positioning system (GPS) of the vehicle) is at or near or approaching a determined and stored hazardous location, such as by accessing a database of known or determined hazardous locations and determining when the current geographical location is at or near or approaching one of the stored hazardous locations in the database. During normal driving, and when the current geographical location of the vehicle is determined to not be at or near or approaching a hazardous location, the system may generate an alert to the driver of the vehicle when the system determines that the driver's hands are not on the steering wheel and the driver is not driving the vehicle for a threshold period of time (e.g., after 15 seconds have elapsed since the system initially determined that the driver's hands were not at the steering wheel). However, if the system determines that the vehicle is at or near or approaching a hazardous location (such as when the vehicle is traveling on a path toward a stored hazardous location and is within, for example, a quarter mile of the hazardous location or will arrive at the hazardous location in less than, for example, 10 seconds at the current vehicle speed), the system may generate a different alert to the driver and/or may generate the alert irrespective of the time that has elapsed after the system first determines that the driver's hands are not at the steering wheel. For example, when the system determines that the driver's hands are not at the steering wheel and also determines that the vehicle is at or near or approaching a hazardous location, the system may generate an alert to the driver, even if only a few seconds have elapsed since the determination that the driver's hands are not at the steering wheel (i.e., responsive to the determination that the vehicle is at or near or approaching a hazardous location, the system changes the alert so that the alert is provided or generated irrespective of the time since the determination that the driver's hands are not at the steering wheel). Thus, the system provides a different or more rapid alert responsive to the system determining that the vehicle is at or near or approaching a hazardous location so that the driver can place his or her hands on the wheel to drive the vehicle (or at least be attentive and in position to drive the vehicle) while the vehicle maneuvers along and past the hazardous location.

Optionally, the system may determine that the vehicle is at or near or approaching a hazardous condition ahead of the vehicle (such as at the road along which the vehicle is traveling). Optionally, the system may determine the hazardous location responsive to a wireless communication (such as a vehicle-to-vehicle or vehicle-to-infrastructure communication) received at the vehicle that is representative of a hazardous condition (such as a traffic accident or the like). Optionally, the system may determine the hazardous location responsive to processing by a data processor of the ECU of data captured by a forward sensing sensor of the vehicle (such as via processing of image data captured by a forward viewing camera of the vehicle or via processing of sensor data captured by a forward sensing radar sensor or lidar sensor of the vehicle or the like). For example, the system may determine that an accident has occurred ahead of the vehicle and may generate the alert to the driver as the vehicle approaches the accident.

The camera or cameras may be part of a driver monitoring system of the vehicle. The system may utilize aspects of head and face direction and position tracking systems and/or eye tracking systems and/or gesture recognition systems. Such head and face direction and/or position tracking systems and/or eye tracking systems and/or gesture recognition systems may utilize aspects of the systems described in U.S. Pat. Nos. 10,065,574, 10,017,114; 9,405,120 and/or 7,914,187, and/or U.S. Publication Nos. US-2021-0291739; US-2020-0202151; US-2020-0143560; US-2020-0320320; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or U.S. patent application Ser. No. 17/301,853, filed Apr. 16, 2021, now U.S. Pat. No. 11,465,561, and/or U.S. provisional applications, Ser. No. 63/260,359, filed Aug. 18, 2021, Ser. No. 63/200,451, filed Mar. 8, 2021, Ser. No. 63/200,315, filed Mar. 1, 2021, Ser. No. 63/200,003, filed Feb. 9, 2021, Ser. No. 63/199,918, filed Feb. 3, 2021, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least 1 million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772 and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driving assist system, the vehicular driving assist system comprising:
    a forward-viewing camera disposed at a windshield of a vehicle equipped with the vehicular driving assist system, the forward-viewing camera viewing forward of the equipped vehicle through the windshield of the equipped vehicle;

wherein the forward-viewing camera comprises a CMOS imaging array having at least one million photosensors arranged in rows and columns;

wherein the forward-viewing camera is operable to capture image data;

an in-cabin camera located in an interior cabin of the equipped vehicle;

wherein the in-cabin camera views at least a steering wheel of the equipped vehicle;

wherein the in-cabin camera is operable to capture image data;

wherein the in-cabin camera comprises a CMOS imaging array having at least one million photosensors arranged in rows and columns;

an electronic control unit (ECU) comprising electronic circuitry and associated software;

wherein image data captured by the forward-viewing camera is transferred from the forward-viewing camera to the ECU and is processed at the ECU to determine a hazardous condition ahead of the equipped vehicle; and wherein processing by the vehicular driving assist system of image data captured by the in-cabin camera determines that at least one hand of a driver of the equipped vehicle is not on the steering wheel of the equipped vehicle when the equipped vehicle is approaching the hazardous condition.

2. The vehicular driving assist system of claim 1, wherein the vehicular driving assist system determines that the driver is not controlling steering of the equipped vehicle after a threshold period of time has elapsed since processing at the ECU of image data captured by the in-cabin camera initially determined that the at least one hand of the driver is not on the steering wheel of the equipped vehicle.

3. The vehicular driving assist system of claim 2, wherein the threshold period of time is not more than 10 seconds.

4. The vehicular driving assist system of claim 2, wherein the threshold period of time is not more than 15 seconds.

5. The vehicular driving assist system of claim 1, wherein a first alert is generated after processing at the ECU of image data captured by the in-cabin camera determines that at least one hand of a driver of the equipped vehicle is not on the steering wheel of the equipped vehicle for a time period that exceeds a first threshold period of time.

6. The vehicular driving assist system of claim 5, wherein the first alert comprises an audible alert generated by an in-cabin speaker of the equipped vehicle.

7. The vehicular driving assist system of claim 5, wherein the first alert comprises a visible alert displayed on a display disposed within the equipped vehicle and viewable by the driver of the equipped vehicle.

8. The vehicular driving assist system of claim 5, wherein the vehicular driving assist system, responsive to determining that the at least one hand of the driver is not on the steering wheel for a second threshold period of time following elapse of the first threshold period of time, generates a second alert.

9. The vehicular driving assist system of claim 8, wherein the vehicular driving assist system, responsive to determining that the at least one hand of the driver is not on the steering wheel for a third threshold period of time following elapse of the second threshold period of time, generates a third alert.

10. The vehicular driving assist system of claim 9, wherein the first alert comprises at least one selected from the group consisting of (i) a visual alert and (ii) an audible alert, and wherein the second alert comprises at least one selected from the group consisting of (i) a visual alert and (ii) an audible alert, and wherein the third alert comprises at least one selected from the group consisting of (i) a visual alert and (ii) an audible alert.

11. The vehicular driving assist system of claim 1, wherein the vehicular driving assist system determines that the equipped vehicle is approaching the hazardous condition via processing at the ECU of sensor data captured by a forward-sensing sensor of the equipped vehicle, and wherein the forward-sensing sensor senses forward of the equipped vehicle, and wherein the forward-sensing sensor is operable to capture sensor data.

12. The vehicular driving assist system of claim 11, wherein the forward-sensing sensor of the equipped vehicle comprises a forward-sensing radar sensor disposed at the equipped vehicle that is operable to capture radar data.

13. The vehicular driving assist system of claim 11, wherein the forward-sensing sensor of the equipped vehicle comprises a forward-sensing lidar sensor disposed at the equipped vehicle that is operable to capture lidar data.

14. The vehicular driving assist system of claim 1, wherein the in-cabin camera is disposed at an interior rearview mirror assembly of the equipped vehicle.

15. The vehicular driving assist system of claim 1, wherein the hazardous condition comprises a traffic accident.

16. The vehicular driving assist system of claim 1, wherein a plurality of hazardous locations are stored in a database, and wherein the vehicular driving assist system determines that the equipped vehicle is approaching the hazardous condition responsive to determination that the equipped vehicle is at or approaching a stored hazardous location of the plurality of hazardous locations stored in the database.

17. The vehicular driving assist system of claim 16, wherein the vehicular driving assist system determines that the equipped vehicle is at or approaching a stored hazardous location when the equipped vehicle is within a threshold distance from one of the hazardous locations stored in the database.

18. The vehicular driving assist system of claim 16, wherein the vehicular driving assist system determines that the equipped vehicle is at or approaching a stored hazardous location when the equipped vehicle is within a threshold time to arrival at one of the hazardous locations stored in the database.

19. The vehicular driving assist system of claim 16, wherein the vehicular driving assist system determines that the equipped vehicle is at or approaching a stored hazardous location based at least in part on a current geographical location of the equipped vehicle.

20. The vehicular driving assist system of claim 1, wherein the vehicular driving assist system determines that the equipped vehicle is approaching the hazardous condition based at least in part on a current geographical location of the equipped vehicle.

21. The vehicular driving assist system of claim 1, wherein the vehicular driving assist system comprises two in-cabin cameras that view at least the steering wheel of the equipped vehicle.

22. The vehicular driving assist system of claim 21, wherein the two in-cabin cameras capture image data in stereo vision.

23. The vehicular driving assist system of claim 1, wherein the ECU processes image data captured by the forward-viewing camera for at least one advanced driver assistance system of the equipped vehicle.

24. The vehicular driving assist system of claim 23, wherein the at least one advanced driver assistance system of the equipped vehicle comprises a headlamp control system.

25. The vehicular driving assist system of claim 23, wherein the at least one advanced driver assistance system of the equipped vehicle comprises a traffic sign recognition system.

26. The vehicular driving assist system of claim 23, wherein the at least one advanced driver assistance system of the equipped vehicle comprises a pedestrian detection system.

27. The vehicular driving assist system of claim 23, wherein the at least one advanced driver assistance system of the equipped vehicle comprises a collision avoidance system.

28. The vehicular driving assist system of claim 23, wherein the at least one advanced driver assistance system of the equipped vehicle comprises a lane marker detection system.

29. The vehicular driving assist system of claim 23, wherein the at least one advanced driver assistance system of the equipped vehicle comprises a lane keep assist system.

30. The vehicular driving assist system of claim 29, wherein the vehicular driving assist system, with the lane keep assist system of the equipped vehicle operating to maintain the equipped vehicle within a traffic lane of a road along which the equipped vehicle is traveling, disables the lane keep assist system of the equipped vehicle responsive to determining, via processing at the ECU of image data captured by the in-cabin camera, that at least one hand of the driver is not on the steering wheel for a time period that exceeds a threshold period of time.

31. The vehicular driving assist system of claim 1, wherein image data captured by the forward-viewing camera is transferred from the forward-viewing camera to the ECU for processing at an image processing chip of the ECU.

32. The vehicular driving assist system of claim 31, wherein the in-cabin camera is part of and captures image data for a driver monitoring system of the equipped vehicle.

33. The vehicular driving assist system of claim 31, wherein image data captured by the in-cabin camera is transferred from the in-cabin camera to the ECU for processing at the ECU.

34. The vehicular driving assist system of claim 1, wherein the in-cabin camera is part of and captures image data for a driver monitoring system of the equipped vehicle.

35. The vehicular driving assist system of claim 34, wherein the driver monitoring system of the equipped vehicle is operable to monitor at least one selected from the group consisting of (i) the head of the driver of the equipped vehicle, (ii) an eye of the driver of the equipped vehicle and (iii) the face of the driver of the equipped vehicle.

36. The vehicular driving assist system of claim 34, wherein image data captured by the in-cabin camera is transferred from the in-cabin camera to the ECU for processing at the ECU.

37. The vehicular driving assist system of claim 1, wherein the ECU processes image data captured by the forward-viewing camera for a lane keep assist system of the equipped vehicle, and wherein the vehicular driving assist system, with a lane keep assist system of the equipped vehicle operating to maintain the equipped vehicle within a traffic lane of a road along which the equipped vehicle is traveling, disables the lane keep assist system of the equipped vehicle responsive to determining, via processing at the ECU of image data captured by the in-cabin camera, that at least one hand of the driver is not on the steering wheel for a threshold period of time.

38. A vehicular driving assist system, the vehicular driving assist system comprising:
a forward-viewing camera disposed at a windshield of a vehicle equipped with the vehicular driving assist system, the forward-viewing camera viewing forward of the equipped vehicle through the windshield of the equipped vehicle;
wherein the forward-viewing camera comprises a CMOS imaging array having at least one million photosensors arranged in rows and columns;
wherein the forward-viewing camera is operable to capture image data;
an in-cabin camera located in an interior cabin of the equipped vehicle;
wherein the in-cabin camera is part of and captures image data for a driver monitoring system of the equipped vehicle;
wherein the in-cabin camera views at least a steering wheel of the equipped vehicle;
wherein the in-cabin camera is operable to capture image data;
wherein the in-cabin camera comprises a CMOS imaging array having at least one million photosensors arranged in rows and columns;
an electronic control unit (ECU) comprising electronic circuitry and associated software;
wherein image data captured by the forward-viewing camera is transferred from the forward-viewing camera to the ECU and is processed at the ECU for at least one advanced driver assistance system of the equipped vehicle; and
wherein processing by the vehicular driving assist system of image data captured by the in-cabin camera determines that at least one hand of a driver of the equipped vehicle is not on the steering wheel of the equipped vehicle for a time period that exceeds a threshold period of time.

39. The vehicular driving assist system of claim 38, wherein the threshold period of time is not more than 10 seconds.

40. The vehicular driving assist system of claim 38, wherein the threshold period of time is not more than 15 seconds.

41. The vehicular driving assist system of claim 40, wherein the driver monitoring system of the equipped vehicle is operable to monitor at least one selected from the group consisting of (i) the head of the driver of the equipped vehicle, (ii) an eye of the driver of the equipped vehicle and (iii) the face of the driver of the equipped vehicle.

42. The vehicular driving assist system of claim 41, wherein the in-cabin camera is disposed at an interior rearview mirror assembly of the equipped vehicle.

43. The vehicular driving assist system of claim 42, wherein the at least one advanced driver assistance system of the equipped vehicle comprises a headlamp control system.

44. The vehicular driving assist system of claim 43, wherein the at least one advanced driver assistance system of the equipped vehicle comprises a lane marker detection system.

45. The vehicular driving assist system of claim 44, wherein the at least one advanced driver assistance system of the equipped vehicle comprises a lane keep assist system.

46. The vehicular driving assist system of claim 44, wherein the at least one advanced driver assistance system of the equipped vehicle comprises a traffic sign recognition system.

47. The vehicular driving assist system of claim 38, wherein the at least one advanced driver assistance system of the equipped vehicle comprises a collision avoidance system.

48. The vehicular driving assist system of claim 38, wherein the at least one advanced driver assistance system of the equipped vehicle comprises a pedestrian detection system.

49. The vehicular driving assist system of claim 38, comprising a forward-sensing sensor disposed at the equipped vehicle, and wherein the forward-sensing sensor senses forward of the equipped vehicle, and wherein the forward-sensing sensor is operable to capture sensor data.

50. The vehicular driving assist system of claim 49, wherein the forward-sensing sensor of the equipped vehicle comprises a forward-sensing radar sensor of the equipped vehicle that is operable to capture radar data.

51. The vehicular driving assist system of claim 49, wherein the forward-sensing sensor of the equipped vehicle comprises a forward-sensing lidar sensor of the equipped vehicle that is operable to capture lidar data.

52. The vehicular driving assist system of claim 49, wherein image data captured by the forward-viewing camera is transferred from the forward-viewing camera to the ECU for processing at an image processing chip of the ECU.

53. The vehicular driving assist system of claim 52, wherein image data captured by the in-cabin camera is transferred from the in-cabin camera to the ECU for processing at the ECU.

54. The vehicular driving assist system of claim 49, wherein at least one selected from the group consisting of (i) the vehicular driving assist system determines that the equipped vehicle is approaching a hazardous condition via processing at the ECU of image data captured by the forward-viewing camera of the equipped vehicle and (ii) the vehicular driving assist system determines that the equipped vehicle is approaching the hazardous condition via processing at the ECU of sensor data captured by the forward-sensing sensor of the equipped vehicle.

55. The vehicular driving assist system of claim 54, wherein the vehicular driving assist system determines that the equipped vehicle is approaching the hazardous condition based at least in part on a current geographical location of the equipped vehicle.

56. The vehicular driving assist system of claim 38, wherein the driver monitoring system of the equipped vehicle is operable to monitor at least one selected from the group consisting of (i) the head of the driver of the equipped vehicle, (ii) an eye of the driver of the equipped vehicle and (iii) the face of the driver of the equipped vehicle.

57. The vehicular driving assist system of claim 56, wherein image data captured by the in-cabin camera is transferred from the in-cabin camera to the ECU for processing at the ECU.

58. The vehicular driving assist system of claim 38, wherein the ECU processes image data captured by the forward-viewing camera for a lane keep assist system of the equipped vehicle, and wherein the vehicular driving assist system, with a lane keep assist system of the equipped vehicle operating to maintain the equipped vehicle within a traffic lane of a road along which the equipped vehicle is traveling, disables the lane keep assist system of the equipped vehicle responsive to determining, via processing at the ECU of image data captured by the in-cabin camera, that at least one hand of the driver is not on the steering wheel for the threshold period of time.

59. A vehicular driving assist system, the vehicular driving assist system comprising:
a forward-viewing camera disposed at a windshield of a vehicle equipped with the vehicular driving assist system, the forward-viewing camera viewing forward of the equipped vehicle through the windshield of the equipped vehicle;
wherein the forward-viewing camera comprises a CMOS imaging array having at least one million photosensors arranged in rows and columns;
wherein the forward-viewing camera is operable to capture image data;
an in-cabin camera located in an interior cabin of the equipped vehicle;
wherein the in-cabin camera is disposed at an interior rearview mirror assembly of the equipped vehicle;
wherein the in-cabin camera is part of and captures image data for a driver monitoring system of the equipped vehicle;
wherein the in-cabin camera views at least a steering wheel of the equipped vehicle;
wherein the in-cabin camera is operable to capture image data;
wherein the in-cabin camera comprises a CMOS imaging array having at least one million photosensors arranged in rows and columns;
wherein the driver monitoring system of the equipped vehicle is operable to monitor at least one selected from the group consisting of (i) the head of a driver of the equipped vehicle, (ii) an eye of the driver of the equipped vehicle and (iii) the face of the driver of the equipped vehicle;
an electronic control unit (ECU) comprising electronic circuitry and associated software;
wherein image data captured by the forward-viewing camera is transferred from the forward-viewing camera to the ECU and is processed at the ECU for at least one advanced driver assistance system of the equipped vehicle;
wherein the at least one advanced driver assistance system of the equipped vehicle comprises at least one selected from the group consisting of (i) a headlamp control system, (ii) a lane keep assist system, (iii) a traffic sign recognition system, (iv) a lane marker detection system and (v) a pedestrian detection system; and
wherein processing by the vehicular driving assist system of image data captured by the in-cabin camera determines that at least one hand of the driver of the equipped vehicle is not on the steering wheel of the equipped vehicle.

60. The vehicular driving assist system of claim 59, comprising a forward-sensing sensor disposed at the equipped vehicle, and wherein the forward-sensing sensor senses forward of the equipped vehicle, and wherein the forward-sensing sensor is operable to capture sensor data.

61. The vehicular driving assist system of claim 60, wherein the forward-sensing sensor of the equipped vehicle comprises a forward-sensing radar sensor of the equipped vehicle that is operable to capture radar data.

62. The vehicular driving assist system of claim 60, wherein the forward-sensing sensor of the equipped vehicle comprises a forward-sensing lidar sensor of the equipped vehicle that is operable to capture lidar data.

63. The vehicular driving assist system of claim 60, wherein image data captured by the forward-viewing camera is transferred from the forward-viewing camera to the ECU for processing at an image processing chip of the ECU.

64. The vehicular driving assist system of claim 63, wherein image data captured by the in-cabin camera is transferred from the in-cabin camera to the ECU for processing at the ECU.

65. The vehicular driving assist system of claim 64, wherein the ECU determines via processing of image data captured by the in-cabin camera that at least one hand of a driver of the equipped vehicle is not on the steering wheel of the equipped vehicle for a time period that exceeds a threshold period of time.

66. The vehicular driving assist system of claim 65, wherein the threshold period of time is not more than 10 seconds.

67. The vehicular driving assist system of claim 65, wherein the threshold period of time is not more than 15 seconds.

68. The vehicular driving assist system of claim 60, wherein at least one selected from the group consisting of (i) the vehicular driving assist system determines that the equipped vehicle is approaching a hazardous condition via processing at the ECU of image data captured by the forward-viewing camera of the equipped vehicle and (ii) the vehicular driving assist system determines that the equipped vehicle is approaching the hazardous condition via processing at the ECU of sensor data captured by the forward-sensing sensor of the equipped vehicle.

69. The vehicular driving assist system of claim 68, wherein the vehicular driving assist system determines that the equipped vehicle is approaching the hazardous condition based at least in part on a current geographical location of the equipped vehicle.

* * * * *

UNITED STATES PATENT AND TRADEMARK OFFICE
CERTIFICATE OF CORRECTION

PATENT NO. : 12,384,401 B2
APPLICATION NO. : 18/459498
DATED : August 12, 2025
INVENTOR(S) : Gaurav S. Kulkarni Page 1 of 1

It is certified that error appears in the above-identified patent and that said Letters Patent is hereby corrected as shown below:

In the Specification

Column 8
Line 30, "5,670,935;" should be --5,550,677; 5,670,935;--

Signed and Sealed this
Ninth Day of September, 2025

Coke Morgan Stewart
*Acting Director of the United States Patent and Trademark Office*